Aug. 22, 1933.    G. C. WHARTON    1,923,467
SHOVEL AND SIMILAR STRUCTURE
Filed Aug. 15, 1932
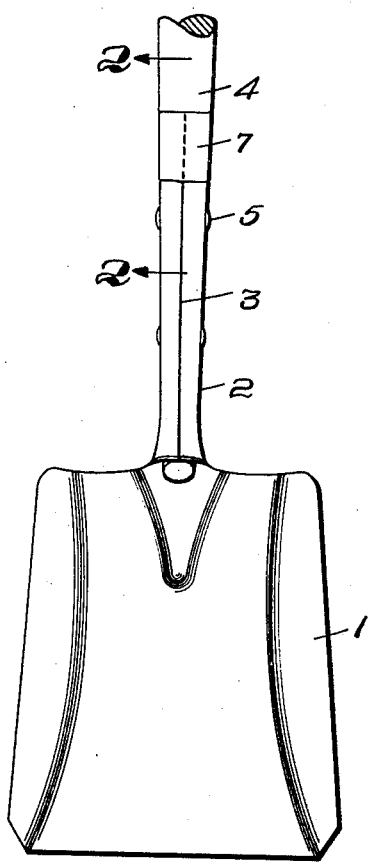
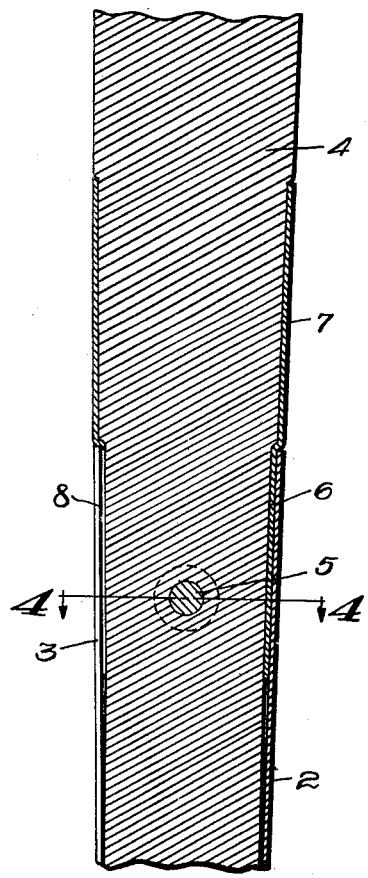
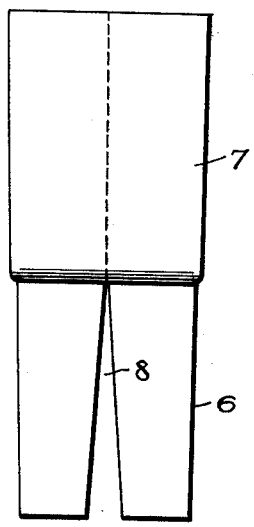
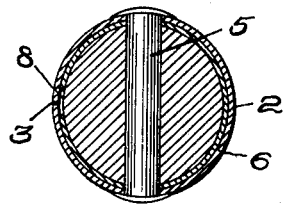
Inventor:
George C. Wharton,
by Emery, Booth, Varney & Townsend
Attys Patented Aug. 22, 1933

1,923,467

UNITED STATES PATENT OFFICE 1,923,467

SHOVEL AND SIMILAR STRUCTURE

George C. Wharton, Parkersburg, W. Va., assignor to Ames Baldwin Wyoming Shovel Co., Parkersburg, W. Va., a Corporation of Delaware Application August 15, 1932. Serial No. 628,823

3 Claims. (Cl. 306—31)

My invention aims to provide improvements in shovels and similar structures.

In the drawing which illustrates a preferred embodiment of my invention:—

Figure 1 is a rear elevational view of the lower portion of a shovel showing the shovel blade, socket and a portion of the handle to illustrate the specific embodiment of my invention;

Fig. 2 is a section taken on the line 2—2 of Figure 1, at an enlarged scale, to show the cooperation of the elements forming my invention;

Fig. 3 is a side elevation of the ferrule used at the joint between the shovel blade socket and the handle in the specific construction selected for illustration; and Fig. 4 is a section taken on the line 4—4 of Fig. 2.

My invention as illustrated by the annexed drawing relates particularly to improvements in the manner of attachment of a handle to the socket of a shovel or like implement. The specific construction selected for illustration shows one form which the combination of elements of my invention may assume and it should be understood that the same results may be secured by different form and arrangement of the elements.

Before the advent of my invention, which has proved commercially successful, the usual practice of attaching wooden handles to the sockets of shovels was to enter a handle into a socket and then rivet the two members together adjacent to the free end of the socket. That type of attachment is satisfactory when the shovel is to be used for relatively light work but when the shovel is to be used for heavy work I have found that the weakest point in the shovel structure is adjacent to where the rivet passes through the handle. In practice I have found that the shovel handle breaks at or adjacent to the rivet hole through the handle.

My improved means of attachment, one form of which is illustrated by the drawing, is of a decided advantage in connection with shovels for heavy duty work. The arrangement of the elements is such that the breaking point of the handle is removed to a point a substantially greater distance from the shovel blade, thereby placing the breaking point where the leverage is less apt to break the handle when the shovel is used as a pry.

Referring now to the specific embodiment of my invention illustrated, I have shown a shovel having a blade 1 (Fig. 1), a handle-receiving socket 2 extending upwardly from the upper edge of the blade 1 and split longitudinally, as illustrated by the slit 3 clearly shown in Figs. 1 and 2, and a wooden handle 4 extending into the socket 2. The handle 4 is secured in the socket 2 in the usual manner by a rivet 5, as illustrated in Figs. 2 and 4. In order to secure the advantage of removing the breaking point from adjacent to the rivet, I have provided a ferrule having a portion 6 interposed between the handle 4 and the socket 2 and a portion 7 extending beyond the free end of the socket 2. The ferrule is formed from a single piece of metal pressed into a tubular shape, preferably slightly tapered throughout its length (Figs. 2 and 3), to fit a tapered handle 4. The ferrule has a seam 8 which is open throughout the length of the portion 6 but closed, as by welding, throughout the length of the portion 7, as best illustrated in Fig. 3. Thus the portion 7 is rigid, while the portion 6 is contractible and expansible circumferentially. The lower portion 6 of the ferrule is preferably long enough so that when the parts are secured together the rivet 5 will pass through the portion 6 (Figs. 2 and 4) thereby being directly compressible against the wooden handle 4.

The handle-receiving socket 2 and the portion 6 of the ferrule are both preferably contractible and expansible circumferentially so that they may be adapted to grip tightly a wooden handle 4 whether or not it is slightly undersized or oversized. Therefore, when the ends of the rivet 5 are headed over (Fig. 4) the portion 6 of the ferrule and the socket portion adjacent thereto are compressed and the handle 4 is gripped tightly, thereby compressing the fibers adjacent to the hole formed therein for the passage of the rivet 5.

Since the portion 7 of the ferrule is in the form of a continuous, substantially rigid ring closely fitting the handle 4, it provides, above the socket 2, a reinforcement for the handle 4 which cooperates with the lower portion 6 and the socket 2. Thus the handle is reinforced from a point adjacent from where the rivet 5 passes through it to the upper edge of the portion 7 (Fig. 2) so that it is less apt to break where enclosed by the ferrule and socket than it is above the ferrule. Therefore, the point at which the handle would break under prying stresses is at the upper edge of the ferrule rather than at the rivet 5 or the upper edge of the socket 2.

By my improved attachment it is possible to secure the parts rigidly together by means of a rivet passing entirely through the handle without causing a weakness in the handle 4 as has been the case heretofore. The arrangement of parts is such that the weakness of the handle at the rivet hole is compensated for and breaking stresses are concentrated in the handle at a point quite remote from the rivet hole so that the normal full strength of the handle may be utilized while securing the most desirable and most permanent attachment of the handle 4 to the socket 2.

While I have illustrated and described a preferred embodiment of my invention I do not wish to be limited thereby because the scope of my invention is best defined by the following claims.

I claim:

1. An implement of the class described comprising a working portion having a hollow socket extending therefrom, at least the outer portion of which is capable of constriction, a permanently fixed wooden handle extending into said socket, a ferrule comprising an unbroken annular outer portion tightly embracing the handle outwardly of said socket and an inner portion having its wall interrupted to provide for radial compressibility thereof and adapted to be forced into intimate engagement with the handle, said inner portion being entered into the outer portion of the socket and a through fastening binding together said outer portion of the socket, said inner portion of the ferrule and the handle.

2. An implement of the class described comprising a working portion having a hollow socket extending therefrom, a permanently fixed wooden handle extending into said socket, a ferrule comprising an unbroken annular outer portion tightly embracing the handle outwardly of said socket and an inner portion having its wall interrupted to provide for radial compressibility thereof and adapted to be forced into intimate engagement with the handle, said inner portion being wedged between the handle and the outer end of the socket and compressed thereby upon the wooden handle and through fastening means permanently securing said parts together.

3. An implement of the class described comprising a working portion having a hollow socket extending therefrom, a permanently fitted wooden handle extending into said socket and bottoming therein by compression of the wooden end portion of the handle against the wall of the socket for a substantial distance, a retaining rivet through the socket and handle, and means for reinforcing the connection at the outer end of of the socket comprising a relatively short ferrule having an unbroken annular portion tightly embracing the handle immediately outward of the end of the socket and an extension therefrom wedged between the wood and the rear portion of the socket wall.

GEORGE C. WHARTON.

CERTIFICATE OF CORRECTION.

Patent No. 1,923,467.  August 22, 1933.

GEORGE C. WHARTON.

It is hereby certified that the name of the assignee in the above numbered patent was erroneously described and specified as "Ames Baldwin Wyoming Shovel Co.," whereas said name should have been described and specified as Ames Baldwin Wyoming Co., as shown by the records of assignments in this office; and that the said Letters Patent should be read with this correction therein that the same may conform to the record of the case in the Patent Office.

Signed and sealed this 5th day of December, A. D. 1933.

F. M. Hopkins (Seal)  Acting Commissioner of Patents.